Figure 1:
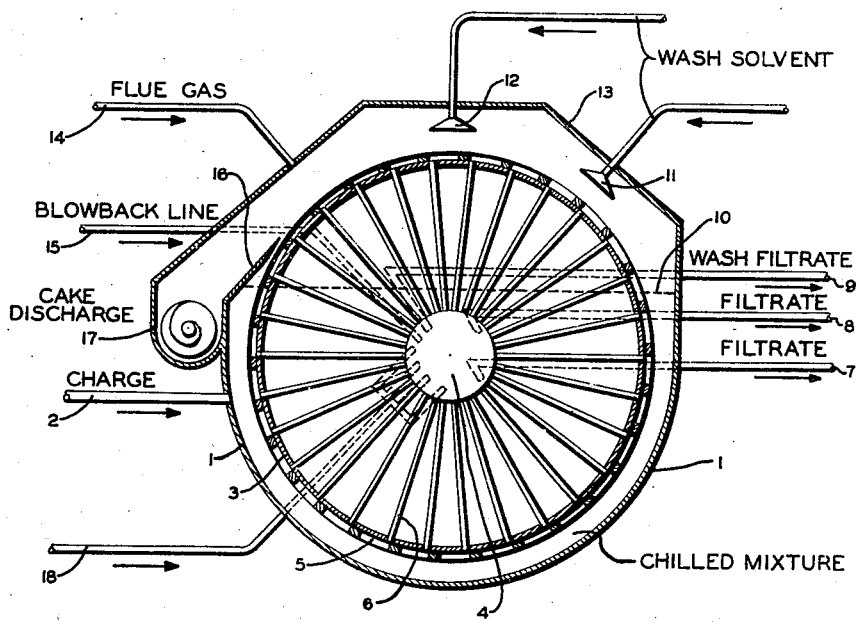

June 17, 1941.　　R. H. AITKEN ET AL　　2,245,952
DEWAXING HYDROCARBON OIL
Filed Feb. 11, 1939

ROBERT H. AITKEN
WYNKOOP KIERSTED JR.
INVENTORS

BY
ATTORNEYS

Patented June 17, 1941

2,245,952

UNITED STATES PATENT OFFICE 2,245,952

DEWAXING HYDROCARBON OIL

Robert H. Aitken Lawrenceville, Ill., and Wynkoop Kiersted, Jr., Scarsdale, N. Y., assignors of one-half to Indian Refining Company, Lawrenceville, Ill., a corporation of Maine, and one-half to The Texas Company, New York, N. Y., a corporation of Delaware Application February 11, 1939, Serial No. 255,810

5 Claims. (Cl. 210—199)

This invention relates to dewaxing hydrocarbon oil by filtration and particularly to the dewaxing of wax-bearing mineral lubricating oils from which wax is precipitated in relatively voluminous form, or from which relatively thick filter cakes of wax are formed rather quickly.

The invention broadly contemplates dewaxing with a continuous type of filter, advantageously of the rotary type, and controlling the thickness of the filter cake by reducing substantially the differential in pressure existing through the filter surface during a predetermined portion of the time during which the filter surface is submerged within the chilled mixture of wax-bearing oil and dewaxing solvent.

The filter may, for example, comprise a hollow rotating cylinder or comprise hollow rotating leaves with means for either creating vacuum within the interior of the filter element, or for exerting positive pressure upon the exterior thereof.

In operation the rotating cylinder is partially submerged in the filtering mixture, the submergence being about 50 to 60% of the filtering surface. Solids are deposited on the submerged portion of the surface to form a cake while liquid flows through the surface into the interior of the cylinder from which it is withdrawn as filtrate. As the cylinder rotates the filter surface, with cake deposited upon it, emerges from the filtering mixture. When the filter surface emerges the filter cake is exposed and is washed by applying solvent liquid to the surface of the cake, preferably in the form of a spray. The wash solvent, together with oil displaced by it, is drawn through the cake and filter cloth into the interior of the cylinder for removal. Upon continued rotation the filter cake is subjected to drying by the passage through it of gas. The cake is removed, usually by applying a slight reverse pressure to the interior of the filter element, causing distension of the fabric and consequent loosening of the cake, complete removal of which is facilitated by suitable scraping means located adjacent to the exterior surface of the filter fabric.

When dewaxing oil from which the wax is precipitated in voluminous form a thick filter cake is formed in relatively short time. The cake contains a large amount of oil, complete removal of which involves considerable difficulty. For example, if, due to the peculiar nature of the stock, the wax is precipitated in an extremely voluminous form, thereby causing the formation of an extremely thick cake in a short time, then the resulting cake retains more oil and requires more washing. The wash solvent acts mainly as a liquid displacing medium, pushing the oil retained in the cake through the pores and interstices within the cake. Consequently, the thicker the cake the greater the time required for complete displacement of the retained oil.

There is a definite limit to the amount of washing that can be accomplished with a continuous rotary filter for a given speed of rotation. While reducing the speed of rotation permits longer washing time, it likewise increases the time for cake formation. Thus, with the type of oil in question a situation occurs where the filter cake formed is too thick to be washed effectively.

One factor which contributes to rapid cake formation is the depth of submergence of the filtering surface within the filtering mixture. The diameter of the rotary drum filters employed in dewaxing is around 8 or 10 feet. Thus, with 50 or 60% submergence of the drum in the filtering mixture, there is a static liquid head of some 5 or 6 feet, or perhaps more, which exerts a substantial pressure upon that portion of the filtering mixture immediately adjacent the submerged filter surface, even though the interior of the filter surface is at substantially atmospheric pressure. This static pressure, of course, increases to a maximum as the filter surface reaches the bottom of the filter bowl.

Where vacuum filtration is being employed the pressure within the filter surface is substantially lower than atmospheric. Consequently, when the filter surface nears the bottom of the filter bowl there is a substantial differential in pressure between the exterior and the interior of the filter surface, due to both the static pressure on the exterior and the vacuum existing in the interior of the filter element. Where a differential in pressure exists through the filter surface filtration occurs. The greater this differential the more rapid is the rate of filtration.

With stocks from which the wax is precipitated in voluminous form, and which contain a large amount of wax, it is desirable to reduce the rate of cake formation so that the cake will not be too thick for effective washing with a rotary type of filter. In other words. it is desirable that the cake should not exceed about ¼" in thickness.

The object of the present invention, therefore, is to reduce the amount of solids deposited upon the filter surface during submergence within the filtering mixture. This is accomplished by equalizing the pressure between the exterior and the interior of the filter surface during a predetermined portion of the time it is submerged. This pressure is equalized advantageously by injecting gas under pressure into the interior of the filter element during submergence. The gas is introduced under sufficient pressure to offset the above-mentioned static pressure existing on the filter surface during a substantial portion of the time that the filter surface is submerged in the filtering mixture.

It is, of course, objectionable to reduce the depth to which the filter surface is submerged, since, as will be explained later, this leads to difficulty in the subsequent washing of the filter cake. Thus, the present invention offers a means of controlling the effect of the static liquid head upon the filter surface without dropping the level of the filtering mixture in the filter bowl and, therefore, without reducing the percentage of submergence.

Figure 2:
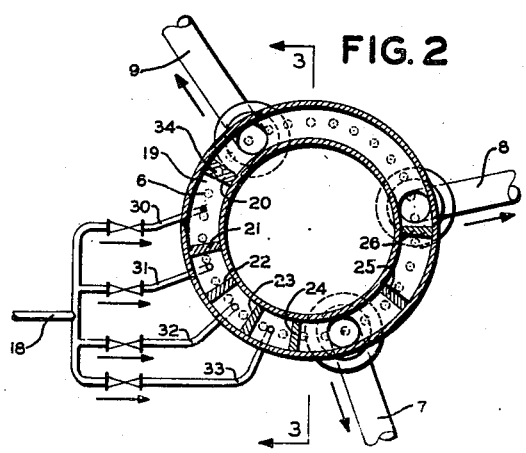
Figure 3:
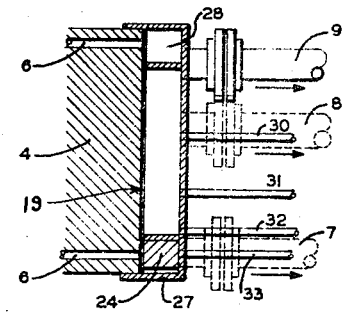

In order to illustrate the invention more fully reference will now be made to the accompanying drawing:

Fig. 1 is a diagrammatic sectional view of a rotary drum filter, while Fig. 2 is an operating diagram of a filter valve, with provision for injecting gas to the interior of the submerged portion of the filter surface. Fig. 3 is a sectional view of the filter valve.

As shown in Fig. 1, the filter comprises a bowl 1, into which the mixture to be filtered is introduced through a pipe 2.

Within the bowl is a horizontal drum 3, rotatably supported by trunnion 4. The trunnion indicated in the figure terminates in the customary filter valve 27, illustrated in Fig. 3 and diagrammatically in Fig. 2.

The cylindrical surface of the drum 3 is surrounded by a filter fabric in the conventional manner. The cylindrical portion of the drum is divided into a plurality of separate segmental sections 5, usually about 30 in number. Each of these segmental sections is connected by tubular means 6 to the filter valve on the trunnion 4. In operation of the filter filtrate is drawn through the filter surface into each segmental section and from there through the tubes 6 to the filter valve, from which it is discharged through pipes 7, 8 and 9.

The solids are deposited in the form of a filter cake upon the outer surface of the filter fabric. As the drum rotates the filter cake emerges from the filtering mixture, the surface of which may be maintained at a point corresponding to that shown by the numeral 10.

Upon emergence the filter cake is subjected to washing by a spray of wash solvent introduced through sprays 11 and 12, extending through the filter shell 13. Upon further rotation the filter cake is subjected to drying by the passage through it of flue gas or other inert gas, such gas being supplied to the interior of the filter shell by the pipes 14 and 15. Following this, the filter cake is discharged. This is accomplished by introducing a reverse pressure to the interior of the filter surface by means of gas introduced through a blowback line 15. In this way the filter fabric is distended and the cake removed therefrom by means of a knife or scraper 16. The dislodged cake is discharged into a trough 17 of a conveyor.

Upon further rotation the filter surface from which the cake has been removed submerges in the filtering mixture. In accordance with the procedure of this invention gas, under pressure, is introduced to the interior of the filter surface through a pipe 18 communicating with the aforementioned filter valve.

In Figs. 2 and 3 numeral 19 designates the rotating bearing surface of the filter valve and in which surface the tubes 6 terminate, affording communication with the aforementioned segmental sections of the filter surface.

Numerals 21 to 26, inclusive, designate removable blocks rigidly attached to the filter valve 27. These blocks are placed within a circular channel 28 of the filter valve 27. They are so formed as to provide a snug fit and thus completely block the channel 28 at the point of their location.

As previously indicated, the trunnion 4 rotates, while the valve 27 remains stationary. The blocks 20 to 26, inclusive, since they are rigidly attached to the valve 27, slide over the surface 19 of the trunnion 4. The surface 19 is advantageously of brass, while the above-mentioned blocks are formed from steel and in this way a slidable, substantially leak-proof joint is provided between the trunnion 4 and the blocks of the filter valve 27.

In operating the filter, in accordance with the method of the present invention, gas, such as flue gas, under pressure is introduced through valved pipes 30, 31, 32 and 33 to the spaces within the channel 28 of the filter valve between the blocks 20 to 24, inclusive. The valves in pipes 30 to 33, inclusive, are adjusted so as to maintain the pressure in each of the aforesaid spaces substantially equivalent to the static pressure existing at the corresponding portion of the filter surface, due to the liquid head of the filtering mixture in the bowl 1.

The gas introduced to the spaces between the blocks 20 to 24, inclusive, flows into the tubes 6 back to the filter surface. By proper adjustment of the gas pressure, the pressure due to static liquid head may be completely offset, so that a zero differential in pressure exists through the filtering surface during the required portion of time that the filter surface is submerged in the filtering mixture.

It is, of course, necessary to provide a plurality of blocks as indicated, so that the gas pressure may be graduated to correspond to the static pressure of the liquid in the filter bowl. Obviously, the number of such blocks may be either less or greater than shown in Fig. 1.

As the filter surface reaches the maximum degree of submergence the static pressure reaches a maximum and therefore the gas introduced at this point must be under increased pressure. Obviously, the gas introduced to the filter valves between blocks 20 and 21 must be at a substantially lower pressure. Otherwise it would escape through the filtering surface to the surface of the filtering mixture in the filter bowl 1.

As the submerged portion of the filter surface continues to rotate through the filtering mixture the termini of its tubes 6 in the trunnion 4 come into communication with the space in the filter valve 27 between blocks 24 and 25, since a reduced pressure exists in this portion of the filter valve due to suction being taken through the filtrate pipes 7 and 8. As a result of this reduction in pressure, filtration occurs and solids are deposited in the form of a cake upon the exterior of the filter surface and the vacuum maintained at this point may, for example, correspond to about 5" of mercury.

As the filter cake emerges from the filtering mixture, the termini of the tubes 6 of the filter surface upon which the cake is deposited come into communication with the space in the filter valve between blocks 26 and 20. The vacuum may be increased at this point, for example, to about 25" of mercury. During this time washing of the cake occurs, as previously described, suction being taken through the wash filtrate outlet pipe 9.

The block 20 contains a passage 34 which communicates with blow-back line 15 and by which means a reverse pressure is placed upon the interior of the filter surface to facilitate cake discharge therefrom.

It will be apparent that the position of the blocks 20 to 26, inclusive, relative to each other and to the trunnion 4, may be altered as desired, depending upon the character of the mixture to be filtered and the type of operation desired.

It will be seen that as a result of injecting gas under pressure through the pipes 30 to 33, inclusive, it is possible to substantially prevent filtration occurring during the time the filter surface is descending into the filtering mixture. In this way filtration, and therefore filter cake formation, may be retarded until the filter surface begins to rise through the filtering mixture. The point at which cake formation is allowed to commence can thus be varied as desired merely by altering the number and relative position of the blocks 21 to 24, inclusive.

To facilitate making these adjustments so as to avoid removing the entire filter valve assemblage it is contemplated that the filter valve 27 may be provided with a suitable opening having a removable plate affording means of access to the blocks 21 to 24.

It was indicated at the outset that the object of the present invention was to provide a means of retarding cake formation without reducing the depth of submergence. In other words, the filter could be operated by maintaining the filter drum submerged in filtering mixture to a depth corresponding to 50 or 60% of its diameter. It was indicated that reducing the liquid level in the filter bowl is objectionable, due to difficulty encountered in washing the filter cake.

Referring to Fig. 1, it will be seen that if the liquid level is maintained at a point below the axis of the rotary drum there is a substantial lapse of time between the point at which the filter cake emerges from the surface of the filtering mixture and that at which it comes into direct contact with the solvent wash issuing from the spray 11. During such lapse of time filtration, of course, continues, due to the vacuum being exerted upon the exposed filter cake. As a result, liquid retained in the cake as it leaves the filtering mixture is drawn into the interior of the filter element. This causes the cake to develop cracks so that when it finally comes into contact with the wash solvent the solvent short-circuits through the cracks. Effective washing of the cake is thus not realized. It is therefore desirable to bring the filter cake into contact with the wash solvent just as soon as possible after the cake emerges from the filtering mixture. This can be accomplished when the surface of the filtering mixture is maintained at a high level in the filter bowl.

If desired, the pipes 30 to 33, inclusive, may be provided with additional ports and valves to permit separate discharge of filtrate therethrough. Thus, in the event of injecting gas through pipes 30 and 31 only, for example, filtrate may then be discharged through pipes 32 and 33 as auxiliaries to pipes 7 and 8.

As previously explained, the invention has particular application in the dewaxing of lubricating oil stocks containing relatively large amounts of wax, and which wax is precipitated in voluminous and bulky form.

In actual operation the lubricating oil stock is mixed with a dewaxing solvent liquid advantageously of the selective type, such as a mixture of methyl ethyl ketone and commercial benzol containing around 40 to 50% of ketone. This solvent mixture is usually mixed with the oil in the proportion of about two to four parts of solvent and one of the oil.

The mixture is chilled to dewaxing temperature of around 0° F. to minus 20° F. The resulting chilled mixture is then introduced to the bowl of a continuous filter, such as described above, and filtered to remove the solidified wax hydrocarbons.

A successful method of controlling the thickness of the filter cake in dewaxing the above type of lubricating oil has involved recycling a substantial portion of the dewaxed filtrate. In this way the concentration of wax in the mixture being filtered is substantially reduced so that a filter cake may be obtained which can be effectively washed. With certain stocks, however, this recycling is undesirable, due to the fact that it may cause a reduction in the filter production rate.

The present invention is of particular importance in the case of such stocks since it permits another means of controlling the thickness of the filter cake without substantially interfering with the production rate of the filter.

It is contemplated that the present invention may also be used in conjunction with an operation wherein a portion of the dewaxed filtrate is mixed with the wax-bearing mixture passing to the filter.

Obviously many modifications and variations of the invention as hereinbefore set forth may be made without departing from the spirit and scope thereof, and therefore only such limitations should be imposed as are indicated in the appended claims.

We claim:

1. In the process of dewaxing mineral oil by continuously filtering the wax-bearing mixture, chilled to a temperature sufficiently low to solidify wax constituents of the oil, and wherein a rotating filtering surface consecutively submerges within the chilled mixture, during which formation of a wax cake occurs, and then emerges from the chilled mixture, during which said cake is washed, dried and discharged therefrom, the method of controlling cake formation which comprises maintaining a substantially zero differential in pressure through the filter surface during a predetermined portion of the time it is descending within the chilled mixture, thereby retarding deposition of solids upon the filter surface until a substantial period of time after the surface has entered the chilled mixture.

2. In the process of dewaxing mineral oil by continuously filtering the wax-bearing mixture, chilled to a temperature sufficiently low to solidify wax constituents of the oil, and wherein a rotating filtering surface consecutively submerges within the chilled mixture, during which formation of a wax cake occurs, and then emerges from the chilled mixture, during which said cake is washed, dried and discharged therefrom, the method of controlling cake formation, which comprises imposing a back pressure within the interior of the submerged filter surface during its descent within the chilled mixture, sufficient to substantially offset the pressure upon the exterior of the filter surface due to the static liquid head of the chilled mixture, thereby substantially preventing deposition of solids upon the filter surface until a substantial period of time after the surface has entered the chilled mixture.

3. In the process of dewaxing mineral oil by continuously filtering the wax-bearing mixture, chilled to a temperature sufficiently low to solidify wax constituents of the oil, and wherein a rotating filtering surface consecutively submerges within the chilled mixture, during which formation of a wax cake occurs, and then emerges from the chilled mixture, during which said cake is washed, dried and discharged therefrom, the method of controlling cake formation, which comprises injecting gas under pressure to the interior of the submerged filter surface for a predetermined portion of its descent within the chilled mixture, sufficient to substantially offset the pressure upon the exterior of the filter surface due to the static liquid head of the chilled mixture, thereby substantially preventing deposition of solids upon the filter surface until a substantial period of time after the surface has entered the chilled mixture.

4. In the process of dewaxing mineral oil by continuously filtering the wax-bearing mixture, chilled to a temperature sufficiently low to solidify wax constituents of the oil, and wherein a rotating filtering surface consecutively submerges within the chilled mixture during which a substantial plus pressure is imposed upon the submerged surface corresponding to the static liquid head of the chilled mixture and during which formation of a wax cake occurs upon the exterior of said surface, and then the filtering surface emerges from the chilled mixture, during which said cake is washed, dried and discharged therefrom, the method of controlling cake formation which comprises injecting gas under progressively increasing pressure to the interior of the filter surface as it descends within the chilled mixture sufficient to offset said plus pressure and thereby delay the flow of filtrate through the surface and thus substantially prevent deposition of solids upon the exterior of the filter surface until a substantial period of time after the surface has entered the chilled mixture.

5. In a continuous rotary filter for dewaxing wax-bearing mineral lubricating oil from a chilled solution of which in a dewaxing solvent the wax is precipitated in voluminous form, means for dividing the filter into a plurality of filter sections, a drainage member connected to each section, means to create a positive flow through the filter sections to bring about a filtering action, valve means to remove filtrate successively from the filter section through the drainage members, means to remove cake from the filter sections successively as it is formed, means included in the valve means to admit pressure to each section to loosen the cake, and other means included in the valve means to admit gaseous fluid pressure into each section through the drainage members prior to and during the initial stages of descent of the sections successively in the chilled mixture being filtered and prior to cake formation.

ROBERT H. AITKEN.
WYNKOOP KIRSTED, Jr.

CERTIFICATE OF CORRECTION.

Patent No. 2,245,952.            June 17, 1941.

ROBERT H. AITKEN, ET AL.

It is hereby certified that error appears in the printed specification of the above numbered patent requiring correction as follows: Page 3, second column, line 52, beginning with "1. In the process" strike out all to and including the word and period "mixture." in line 68, comprising claim 1; and for the claims now appearing in the patent as numbers 2, 3, 4 and 5 read 1, 2, 3 and 4 respectively; page 4, first column, line 4, before "back" insert --positive fluid--; line 5, after "during" insert --at least a portion of--; and second column, after line 36 and before the signatures to the specification, insert the following as claim 5 -

> 5. In a continuous rotary filter for dewaxing wax-bearing mineral lubricating oil from a chilled solution of which in a dewaxing solvent the wax is precipitated in voluminous form, means for dividing the filter into a plurality of filter sections, a drainage member connected to each section, means to create a positive flow through the filter sections to bring about a filtering action, valve means to remove filtrate successively from the filter section through the drainage members, scraper means to remove cake from the filter sections successively as it is formed, conduit means communicating with said valve means for admitting fluid under pressure to the interior of each section to loosen the cake, and other conduit means communicating with said valve means for admitting gaseous fluid pressure into each section through the drainage members prior to and during the initial stages of descent of the sections successively in the chilled mixture being filtered and prior to cake formation. ;

and that the said Letters Patent should be read with this correction therein that the same may conform to the record of the case in the Patent Office.

Signed and sealed this 12th day of August, A. D. 1941.

(Seal)                                              Henry Van Arsdale,
Acting Commissioner of Patents.